(12) United States Patent
Yuuki et al.

(10) Patent No.: US 12,037,033 B2
(45) Date of Patent: Jul. 16, 2024

(54) DEVICE STATE RECORDING SYSTEM AND DEVICE STATE RECORDING DEVICE

(71) Applicants: KABUSHIKI KAISHA TOSHIBA, Minato-ku (JP); TOSHIBA INFRASTRUCTURE SYSTEMS & SOLUTIONS CORPORATION, Kawasaki (JP)

(72) Inventors: Kazuaki Yuuki, Tokorozawa (JP); Tatsuhiro Yamaguchi, Urayasu (JP); Yukiteru Nozawa, Nakano (JP); Hayato Toda, Komae (JP); Yuji Miyagawa, Yokohama (JP); Isao Takahashi, Fuchu (JP)

(73) Assignees: KABUSHIKI KAISHA TOSHIBA, Tokyo (JP); TOSHIBA INFRASTRUCTURE SYSTEMS & SOLUTIONS CORPORATION, Kawasaki (JP)

( * ) Notice: Subject to any disclaimer, the term of this patent is extended or adjusted under 35 U.S.C. 154(b) by 1029 days.

(21) Appl. No.: 16/935,755

(22) Filed: Jul. 22, 2020

(65) Prior Publication Data
US 2020/0346672 A1 Nov. 5, 2020

Related U.S. Application Data

(63) Continuation of application No. PCT/JP2019/000443, filed on Jan. 10, 2019.

(30) Foreign Application Priority Data

Jan. 24, 2018 (JP) .................................. 2018-009984

(51) Int. Cl.
*B61L 25/04* (2006.01)
*B61L 15/00* (2006.01)

(52) U.S. Cl.
CPC ........... *B61L 25/04* (2013.01); *B61L 15/0081* (2013.01)

(58) Field of Classification Search
CPC .. B61L 15/00; B61L 15/0018; B61L 15/0063; B61L 15/0072; B61L 25/00; B61L 25/02; B61L 25/04; B61L 25/06
See application file for complete search history.

(56) References Cited

U.S. PATENT DOCUMENTS

| | | | |
|---|---|---|---|
| 9,633,489 | B2 | 4/2017 | Schmitz et al. |
| 2011/0216200 | A1 | 9/2011 | Chung et al. |
| 2016/0142493 | A1 | 5/2016 | Moriguchi et al. |
| 2016/0325767 | A1 | 11/2016 | Lefebvre et al. |

FOREIGN PATENT DOCUMENTS

| | | |
|---|---|---|
| EP | 3 246 223 A1 | 11/2017 |
| JP | 5-199602 A | 8/1993 |

(Continued)

OTHER PUBLICATIONS

International Search Report dated Apr. 16, 2019 in PCT/JP2019/000443 (with English translation), 2 pages.

(Continued)

*Primary Examiner* — Robert J McCarry, Jr.
(74) *Attorney, Agent, or Firm* — Maier & Maier, PLLC

(57) ABSTRACT

A device state recording system includes a ground system and an on-board system. The device state recording system records a state quantity of a device in the on-board system in response to an instruction from the ground system. The on-board system includes a state recording device provided in the device. A device-side parameter setter sets at least a parameter related to generation of a trigger condition for instructing start of recording of the state quantity of the device, and a parameter related to the state quantity of the device. A state record storage records therein a state quantity of a device that records the state quantity of the device based (Continued)

on the parameter related to generation of the trigger condition and the parameter related to the state quantity of the device.

15 Claims, 5 Drawing Sheets

(56) References Cited

FOREIGN PATENT DOCUMENTS

| JP | 6-261408 A | 9/1994 | |
| JP | H 06261408 * | 9/1994 | ................ B60L 3/12 |
| JP | 2008-144435 A | 6/2008 | |
| JP | 4487007 B2 | 6/2010 | |
| JP | 2013-139205 A | 7/2013 | |
| JP | 5737696 B2 | 6/2015 | |
| JP | 2016-95834 A | 5/2016 | |
| WO | WO 2015/015864 A1 | 2/2015 | |

OTHER PUBLICATIONS

English translation of the International Preliminary Report on Patentability and Written Opinion of the International Searching Authority dated Aug. 6, 2020 in PCT/JP2019/000443, 8 pages.
Cyril Verdun, "Le train connecté et intelligent," Revue Générale Des Chemins De Fer, Mar. 2016, XP001526832, 13 pages (with English Abstract).

* cited by examiner

|  | ADDRESS | VARIABLE | VALUE |
|---|---|---|---|
| STATE QUANTITY ADDRESS | 0000h | AAAA | XXXX |
|  | 0001h | BBBB | XXXX |
|  | 0002h | CCCC | XXXX |
|  | 0003h | DDDD | XXXX |
|  | 0004h | EEEE | XXXX |
|  | .. | | |
| STORAGE ADDRESS | 1000h | RECORDING VARIABLE 1 | 0001h |
|  | 1001h | RECORDING VARIABLE 2 | 0003h |
|  | ... | | |
|  | 0FFFFh | | |

FIG. 3

|  | ADDRESS | VARIABLE | VALUE |
|---|---|---|---|
| STATE QUANTITY ADDRESS | 0000h | AAAA | |
|  | 0001h | BBBB | |
|  | 0002h | CCCC | |
|  | 0003h | DDDD | |
|  | 0004h | EEEE | |
|  | .. | | |
| STORAGE ADDRESS | 1000h | RECORDING VARIABLE 1 | 0001h |
|  | 1001h | RECORDING VARIABLE 2 | 0003h |
|  | 1002h | RECORDING VARIABLE 3 | 0004h |
|  | .. | | |
| TRIGGER CONDITION ADDRESS | 0E000h | | |
|  | 0E001h | 0001h | |
|  | 0E002h | 0003h | |
|  | 0E003h | 0F000h | |
|  | ... | | |
|  | 0FFFFh | | |

FIG. 4

DEVICE STATE RECORDING SYSTEM AND DEVICE STATE RECORDING DEVICE

FIELD

An embodiment of the present invention relates to a device state recording system and a device state recording device.

BACKGROUND

In railways, a train control and monitoring system (TCMS) is generally connected to devices mounted on a train such as a main converter (CI: Converter-Inverter), a brake system, an auxiliary power unit (SIV: Static Inverter), and an air-conditioning system (HVAC: Heating, Ventilation, and Air Conditioning) to transmit information (data) and a control command. Further, due to recent development of technologies of IoT (Internet of Things), pieces of information of various devices and data of sensors have been utilized for analysis. Therefore, pieces of data have been accumulated by connecting an on-board gateway device (on-board GW device) to the train control and monitoring system to transmit data to a ground server. Various types of analysis have been performed based on the accumulated data. Accordingly, various services have been provided, and trials to perform preventive maintenance such as prehension of abnormality prediction have been performed. Regarding the abnormality prediction, a method of detecting, for example, an abnormal state of a device or a function by analyzing the accumulated data has been used. Accordingly, in order to analyze abnormality prediction and detailed phenomena of factors of abnormal operations, it is effective to analyze the accumulated data. Further, a device may cause an abnormal operation such as a protective operation.

For analysis of the protective operation, an output signal of the device is taken into a failure log of the device in some cases. In this case, a trigger condition of a recording trigger of the failure log may be changed to perform another test. Similarly, in order to analyze abnormality prediction and detailed phenomena of factors of abnormal operations, it may be necessary to change a trigger condition for acquiring pieces of information, thereby requiring acquisition of data again. This requires modification of software. However, in order to modify the software, verification to guarantee the operation is required. Further, when similar systems and devices are provided in large number in a train formation or a vehicle, it is difficult to install modified software for all the systems and devices in terms of workload. In this manner, it has been conventionally difficult to change the trigger condition by modifying the software to take a prompt action.

Further, in the present mechanism of the railway IoT, data acquired from a device is transmitted to a ground server constantly. Due to influences of the communication volume of data, the load on the ground server, the entire processing speed, and the like, the transmission speed to the ground server may be limited to, for example, a sampling order of about 100 milliseconds. Meanwhile, for example, in order to analyze the operation of an electric system of a main converter, data sampling is required in an order of several hundred microseconds. In this manner, due to the limitation of the transmission speed to the ground server, the sampling order for clarifying a response phenomenon of the device may be restricted.

CITATION LIST

Patent Literatures

[Patent Literature 1] Japanese Patent Application No. 2006-331687
[Patent Literature 2] Japanese Patent Application No. 2015-164363
[Patent Literature 3] Japanese Patent No. 5737696

SUMMARY

Technical Problem

An object of the present invention is to provide a device state recording system and a device state recording device that can change a trigger condition to record a state quantity of a device by changing a parameter.

Solution to Problem

A device state recording system comprises a ground system and an on-board system. A state quantity of a device in the on-board system is recorded in response to an instruction from the ground system. The on-board system includes a state recording device provided in the device. The state recording device includes a device-side parameter setter and a state record storage. The device-side parameter setter is configured to set at least a parameter related to generation of a trigger condition for instructing start of recording of the state quantity of the device, and a parameter related to the state quantity of the device. The state record storage is configured to record therein the state quantity of the device based on the parameter related to generation of the trigger condition and the parameter related to the state quantity of the device.

BRIEF DESCRIPTION OF DRAWINGS

FIG. 3 is a diagram illustrating an example of addresses to be stored in a state-recording variable-address storage.
FIG. 4 is a diagram for explaining an example of addresses used by a trigger calculator.

DESCRIPTION OF EMBODIMENTS

Figure 1:
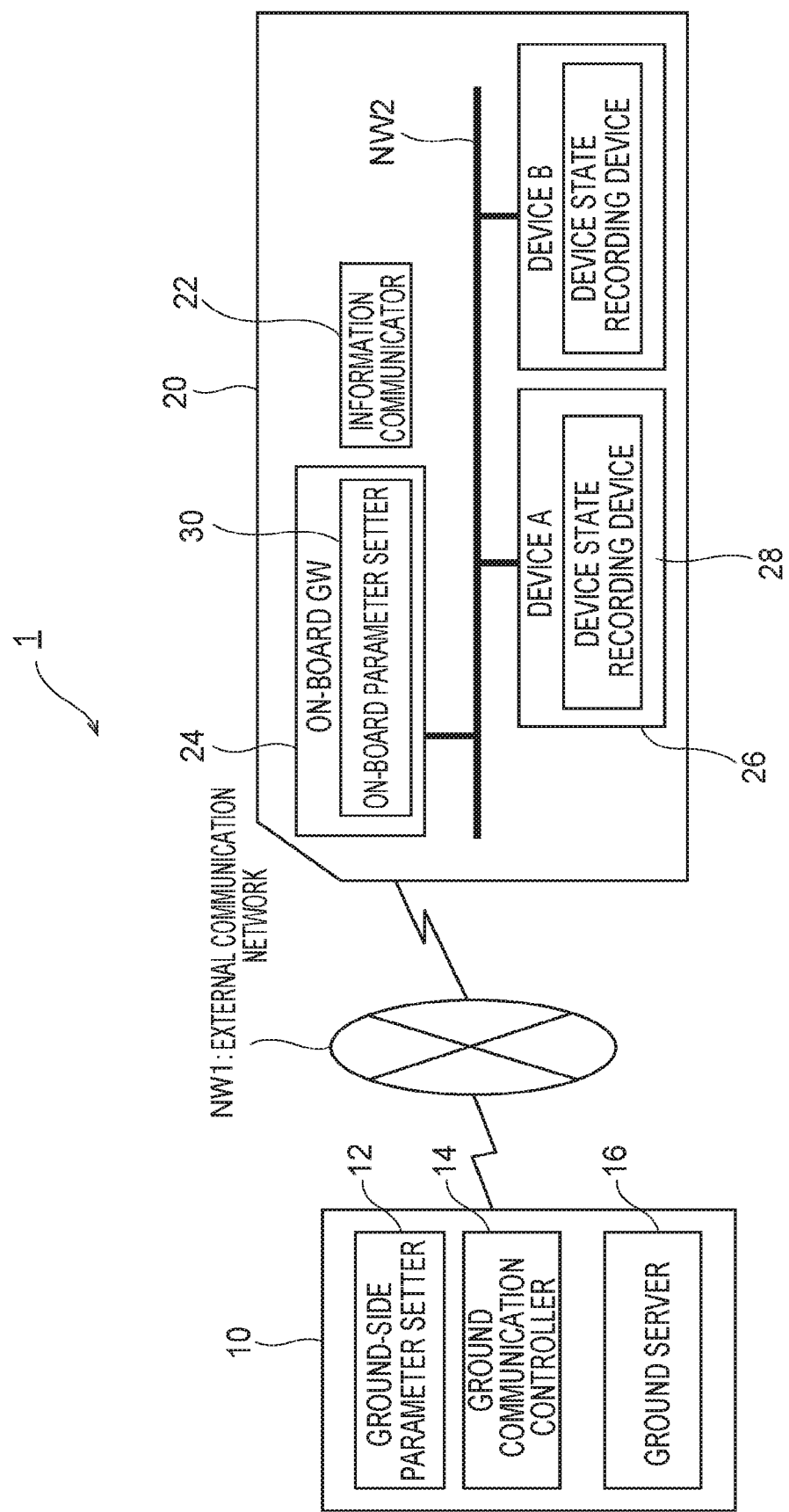
FIG. 1 is a block diagram illustrating a configuration of a device state recording system according to one embodiment.

A device state recording device and a device state recording system according to embodiments of the present invention will now be explained in detail with reference to the accompanying drawings. The embodiments described below are only examples of the embodiments of the present invention and it is not to be understood that the present invention is limited to these embodiments. In the drawings referred to in the embodiments, same parts or parts having identical functions are denoted by like or similar reference characters and there is a case where redundant explanations thereof are omitted. Further, for convenience of explanation, there are cases where dimensional ratios of the parts in the drawings are different from those of actual products and some part of configurations is omitted from the drawings.

FIG. 1 is a block diagram illustrating a configuration of a device state recording system 1 according to one embodiment. As illustrated in FIG. 1, the device state recording system 1 is a system that records a state quantity of a device that is mounted on, for example, a train, and is configured to include a ground system 10 and an on-board system 20 that can communicate with each other. The device state recording system 1 records a state quantity of a device in the on-board system 20 in response to an instruction from the ground system 10. The device state recording system 1 according to the embodiment is described in an example of recording a state quantity of a device mounted on a train. However, the device state recording system 1 is not limited thereto and may be used to record a state quantity of a device mounted on, for example, a bus, an aircraft, or general vehicles.

The ground system 10 is a system arranged in, for example, a central control room of a train, in order to monitor the state of devices mounted on a plurality of trains. The ground system 10 is configured to include a ground-side parameter setter 12, a ground communication controller 14, and a ground server 16.

The on-board system 20 is a system that records state quantities of respective devices according to a trigger condition set, for example, by the ground system 10. The on-board system 20 is configured to include an information communicator 22, an on-board gateway (on-board GW) 24, a plurality of devices 26, a plurality of device state recording devices 28, and an internal communication network (network) NW2.

The ground-side parameter setter 12 sets a parameter to be used for generating a trigger condition that causes the device 26 mounted on a train to record the state quantity. More specifically, the ground-side parameter setter 12 sets at least one of a parameter related to generation of the trigger condition for instructing start of recording of the state quantity of the device 26, and a parameter related to the state quantity of the device 26. Further, the ground-side parameter setter 12 supplies the parameter to the ground communication controller 14.

The ground communication controller 14 is capable of communicating with a plurality of trains, and controls communication with the on-board system 20 of an intended train. That is, the ground communication controller 14 controls communication with the on-board system 20 including transmission of a parameter to the on-board system 20. For example, the ground communication controller 14 performs processing such as encoding and compression transform with respect to the parameter, and transmits the parameter to the on-board system 20 via an external communication network NW1. Further, the ground communication controller 14 performs processing such as decoding and decompression transform with respect to information received via the external communication network NW1, and accumulates the pieces of information in the ground server 16. In this manner, the information of the device of the on-board system 20 is recorded by the ground server 16 of the ground system 10. The external communication network NW1 may be wired or wireless, and may have any communication form. Further, setting of information such as the parameter may be performed by a mobile storage medium, instead of using the external communication network NW1. The ground communication controller 14 according to the present embodiment corresponds to a first communication controller.

The ground server 16 acquires and accumulates the state quantity of the device 26 recorded in the device state recording devices 28 of the on-board system 20 via the ground communication controller 14. Further, the ground server 16 analyzes the accumulated state quantities of the devices 26. For example, the ground server 16 analyzes data to detect a device 26 that behaves abnormally or detect abnormality prediction of the device 26. Further, the ground server 16 accumulates the state quantity of the device 26 and the trigger condition that has been used to record the state quantity of the device 26 in association with each other. That is, the ground server 16 analyzes the state quantity of the device 26 recorded in a state record storage 52 based on the parameter related to generation of the trigger condition and a parameter related to the type of the state of the device 26. Accordingly, abnormality prediction of the device and factor analysis of a failure can be performed in association with the trigger condition or the like. The ground server 16 according to the present embodiment corresponds to an analyzer.

The information communicator 22 controls communication with the ground system 10, including reception of a parameter. The information communicator 22 performs communication with the ground communication controller 14 of the ground system 10, for example, via the external communication network NW1. The information communicator 22 according to the present embodiment corresponds to a second communication controller.

The on-board gateway 24 performs processing such as decoding and decompression transform with respect to information acquired via the information communicator 22 and the external communication network NW1, and sets a parameter for setting a trigger condition to each of the device state recording devices 28. Further, the on-board gateway 24 performs processing such as encoding and compression transform with respect to pieces of information acquired from the devices 26, and transmits the information to the ground system 10 by the information communicator 22 via the external communication network NW1.

Each of the devices 26 is a device mounted on, for example, a train. These devices 26 are, for example, a main converter (CI), a brake system, an auxiliary power unit (SIV), or an air-conditioning system (HVAC). Further, the devices 26 can communicate with a device in the on-board system 20 via the internal communication network NW2 directly or indirectly.

Each of the device state recording devices 28 is provided in a corresponding device 26 to record the state quantity of the corresponding device 26. For example, if the device 26 is a brake system, the device state recording devices 28 records air pressure or the like, and if the device 26 is an air-conditioning system, the device state recording devices 28 records temperature, voltage, current, power consumption, and the like.

Figure 2:
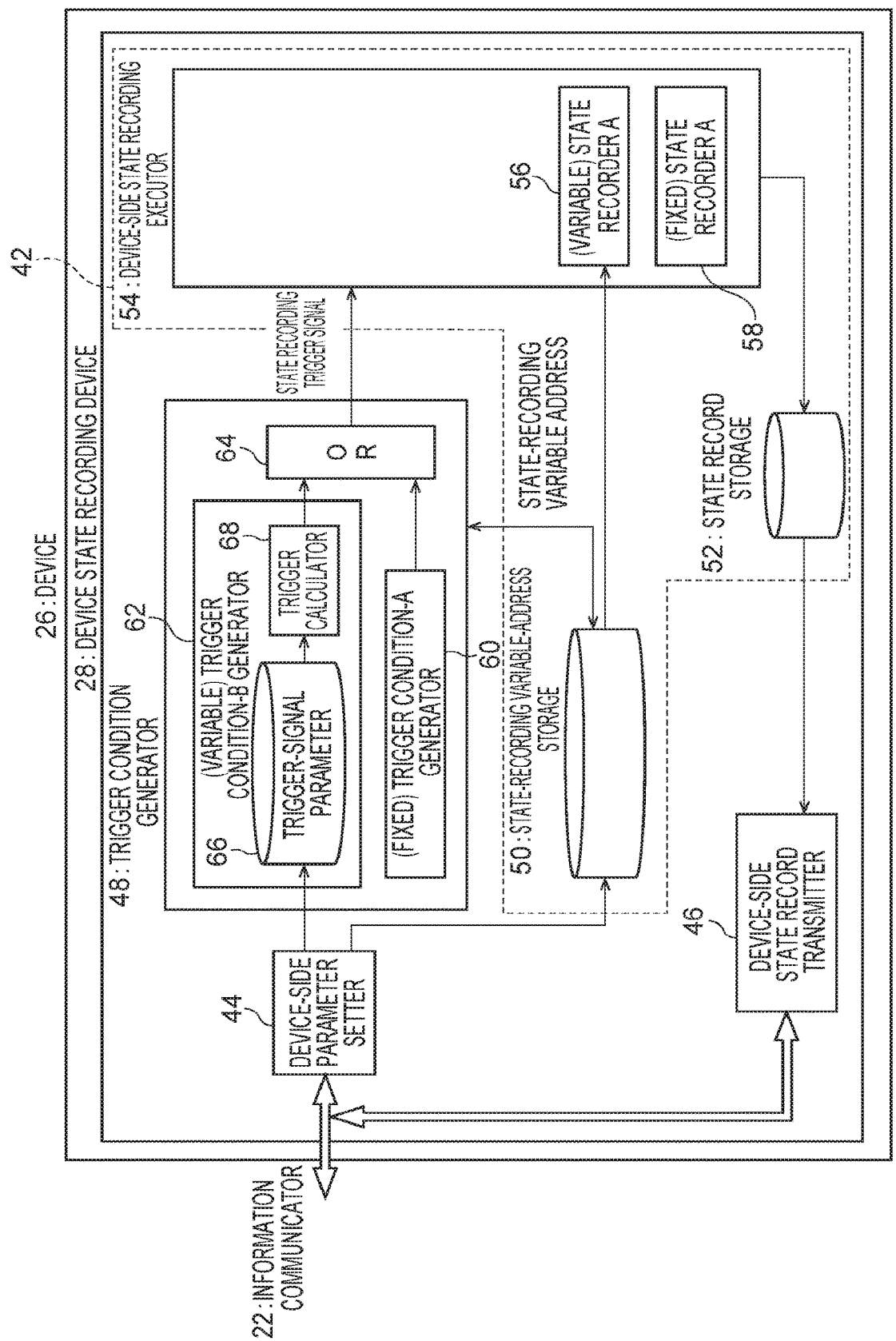
FIG. 2 is a block diagram illustrating a detailed configuration of the device state recording device.

FIG. 2 is a block diagram illustrating a detailed configuration of the device state recording device 28. As illustrated in FIG. 2, the device state recording device 28 is configured to include a recorder 42, a device-side parameter setter 44, a device-side state record transmitter 46, and a trigger condition generator 48.

An on-board parameter setter 30 in the on-board gateway 24 sets the parameter received by control of the information communicator 22 in the device state recording devices 28. The recorder 42 records the state quantity of the device 26. Detailed configurations of the recorder 42 are described later.

The device-side parameter setter 44 sets at least one of a parameter related to generation of a trigger condition for instructing start of recording of the state quantity of the device 26, and a parameter related to the state quantity of the device 26. For example, the device-side parameter setter 44 sets a parameter related to the device 26, of the parameters set by the on-board parameter setter 30. The device-side parameter setter 44 is configured to include a processor, and acquires at least one of the parameter related to generation of a trigger condition and the parameter related to the state quantity of the device 26 from the ground-side parameter setter 12 (FIG. 1) via the external communication network NW1, the information communicator 22, and the on-board parameter setter 30. The device-side parameter setter 44 sets at least one of the parameter related to generation of a trigger condition and the parameter related to the state quantity of the device 26 in the trigger condition generator 48 and a state-recording variable-address storage 50 described later. These parameters may be supplied to the device-side parameter setter 44 from a man-machine IF device being present in the on-board system 20. Here, the term "processor" means, for example, a circuit such as a CPU (Central Processing Unit) or a GPU (Graphics Processing Unit). Details of the parameter are described later.

The device-side state record transmitter 46 communicates with each device in the on-board system 20 via the internal communication network (network) NW2.

The trigger condition generator 48 generates a trigger condition based on the parameter set by the device-side parameter setter 44. The trigger condition generator 48 is configured to include, for example, a processor and when the trigger condition is established with respect to the state quantity of the device acquired from the device 26, causes the recorder 42 to record the state quantity of the device 26. In this case, the trigger condition generator 48 may release establishment of the trigger condition when a predetermined time has passed from establishment of the trigger condition. Accordingly, the trigger condition generator 48 can cause the recorder 42 to end recording of the state quantity of the device 26 after passage of the predetermined time since establishment of the trigger condition. For example, the trigger condition generator 48 outputs a state recording trigger signal to the recorder 42 in a period during which the recorder 42 is caused to record the state quantity of the device 26. In this manner, the trigger condition generator 48 causes the recorder 42 to record the state quantity of the device 26 in a period during which the trigger condition is established, and does not cause the recorder 42 to record the state quantity of the device 26 in other periods. Therefore, an increase of the recording amount in the state record storage 52 can be suppressed. Detailed configurations of the trigger condition generator 48 are described later.

Detailed configuration of the recorder 42 are described here. The recorder 42 includes the state-recording variable-address storage 50, the state record storage 52, and a device-side state recording executor 54.

FIG. 3 is a diagram illustrating an example of addresses to be stored in the state-recording variable-address storage 50. As illustrated in FIG. 3, the state-recording variable-address storage 50 stores therein addresses, variables each corresponding to the addresses, and values. The state-recording variable-address storage 50 is realized by, for example, a semiconductor memory device such as a RAM (Random Access Memory) or a flash memory, a hard disk, an optical disk, or the like.

The state-recording variable-address storage 50 is a memory space accessible by the device-side parameter setter 44, and the addresses to be stored in the state-recording variable-address storage 50 are divided into a state quantity address being a memory area to record the state quantity of the device, a storage address being a memory area to record an address of the state quantity address, a trigger condition address being a memory area to record the trigger condition, and an operator address being a memory area to record the type of an operator.

For example, addresses from 0000h to 0FFFh are the state quantity addresses, addresses from 1000h 0DFFFh are the storage addresses, and addresses after an address 0F000h are the trigger condition addresses and the operator addresses described later. Values set in the storage addresses from 1000h to 1FFFh correspond to recording parameters. For example, a value "0001h" of a recording variable 1 at the storage address "1000h" corresponds to a recording parameter.

Accordingly, the device-side parameter setter 44 sets recording parameters at a plurality of addresses from 1000h to 1FFFh in the memory space accessible by the device-side parameter setter 44, and the state quantity of the device 26 in which the recording parameter is set is recorded in a plurality of addresses from 0000h to 0FFFFh.

As illustrated in FIG. 2, the state record storage 52 records therein the state quantity and the like of the device 26. The state record storage 52 is realized by, for example, a semiconductor memory device such as a RAM (Random Access Memory) or a flash memory, a hard disk, an optical disk, or the like. That is, the state record storage 52 records therein the state quantity of the device 26 based on the parameter related to generation of the trigger condition and the parameter related to the state quantity of the device 26. The state record storage 52 records therein data, for example, in a log file-like format. Further, upon reception of a read request of the state records via the information communicator 22, the state record storage 52 transmits the state quantity of the device 26 recorded in the state record storage 52 to a request sender by the information communicator 22. For example, when there is a read request of the state records from the ground server 16 of the ground system 10, the information communicator 22 transmits the state quantity of the device 26 recorded in the state record storage 52 to the ground server 16.

The device-side state recording executor 54 is configured to include a processor, and executes control to record the state quantity of the device 26 in the state record storage 52 based on the trigger condition generated by the trigger condition generator 48. For example, the device-side state recording executor 54 uses information included in a state recording trigger signal output from the trigger condition generator 48 to record the state quantity of the device 26 in the state record storage 52. Further, the device-side state recording executor 54 executes control to record the state quantity of the device 26 in the state record storage 52 without affecting the operation of the on-board system 20. The device-side state recording executor 54 includes a (variable) state recorder A 56 and a (fixed) state recorder A 58.

The (variable) state recorder A 56 is realized by, for example, a semiconductor memory device such as a RAM (Random Access Memory) or a flash memory, a hard disk, an optical disk, or the like. The (variable) state recorder A 56 has a memory area corresponding to addresses from 0000h to 0FFFh (FIG. 3) stored in the state-recording variable-address storage 50.

Further, in the (variable) state recorder A 56, a memory area is set in which data is output from the state-recording variable-address storage 50 to the state record storage 52. That is, memory areas corresponding to values of the storage addresses from 1000h to 0DFFF1 (FIG. 3) stored in the state-recording variable-address storage 50 are set in the (variable) state recorder A 56. For example, an address "0001h" being a recording parameter of a recording variable 1, that is, a memory area corresponding to a variable "AAAA" is set in the (variable) state recorder A 56. That is, recording variables 1 to N are variables to be set in the state record storage 52. Accordingly, for example, when an output of the recording variable 1 is instructed by the device-side state recording executor 54, a value of the memory area corresponding to the variable "AAAA" in the (variable) state recorder A 56 is output.

The (fixed) state recorder A 58 has a similar configuration to that of the (variable) state recorder A 56, and is realized by a semiconductor memory device such as a RAM (Random Access Memory) or a flash memory, a hard disk, an optical disk, or the like. The state quantity acquired from the device 26 is recorded in real time in a predetermined memory area in the (fixed) state recorder A 58 based on a fixed trigger condition described by software.

As described above, the state-recording variable-address storage 50 supplies storage address information to the device-side state recording executor 54. Accordingly, for example, when the ground-side parameter setter 12 (FIG. 1) sets a value of an address "1000h" to a recording parameter "0001h" as a recording variable 1, and sets a value of an address 1001h to a recording parameter "0003h" as a recording variable 2 in the state-recording variable-address storage 50 via the device-side parameter setter 44, pieces of information in the (variable) state recorder A 56 corresponding to the addresses 1000h and 0003h are recorded in the state record storage 52.

That is, as a variable name "recording variable 1" at the address "1000h", a value of the recording parameter "0001h" (a variable AAAA) is recorded, and as a variable name "recording variable 2" at the address "1001h", a value of the recording parameter "0003h" (a variable CCCC) is recorded. For example, when it is assumed that an output voltage of the power converter is stored at the address "0001h", an output current of the power converter is stored at the address "0002h", an input voltage of the power converter is stored at the address "0003h", an input current of the power converter is stored at the address "0004h", and an ambient temperature of the power converter is stored at the address "0005h", a required state quantity can be recorded by setting the address where the state quantity, which is desired to record, is stored.

In this manner, the ground-side parameter setter 12 (FIG. 1) can set or change an address, being a recording parameter to be stored at a storage address in the state-recording variable-address storage 50, via the device-side parameter setter 44. Accordingly, by setting or changing the recording parameter to be stored at the storage address, a value of an arbitrary variable recorded at the state quantity address can be recorded in the state record storage 52.

Detailed configuration of the trigger condition generator 48 are described here. The trigger condition generator 48 includes a (fixed) trigger condition-A generator 60, a (variable) trigger condition-B generator 62, and a transmission circuit 64.

The (fixed) trigger condition-A generator 60 determines whether a fixed trigger condition is established by using the state quantity of the device acquired from the device 26. When the fixed trigger condition is established, the (fixed) trigger condition-A generator 60 instructs the device-side state recording executor 54 to record the state quantity of the device acquired from the device 26. More specifically, the (fixed) trigger condition-A generator 60 outputs a state recording trigger signal for outputting the state quantity in the (fixed) state recorder A 58 to the device-side state recording executor 54. Accordingly, the device-side state recording executor 54 outputs the state quantity, to be input in real time to the fixed memory area in the (fixed) state recorder A 58, to the state record storage 52. The fixed trigger condition can be described by the software.

Upon establishment of the trigger condition set by using the information acquired by the device-side parameter setter 44, the (variable) trigger condition-B generator 62 instructs the device-side state recording executor 54 to record the state quantity of the device acquired from the device 26. More specifically, the (variable) trigger condition-B generator 62 outputs a state recording trigger signal including information of recording variables that causes outputs at the storage addresses 1000h to 1FFFh (FIG. 3) in the (variable) state recorder A 56 to the device-side state recording executor 54. For example, the (variable) trigger condition-B generator 62 outputs a state recording trigger signal including the information of the recording variables 1 to 3 corresponding to the storage address 1000h to the storage address 1002h (FIG. 4) to the device-side state recording executor 54. Accordingly, the device-side state recording executor 54 performs a process to output the state quantity corresponding to the recording variables 1 to 3 included in the state recording trigger signal in the (variable) state recorder A 56 to the state record storage 52.

The transmission circuit 64 transmits output signals from the (fixed) trigger condition-A generator 60 and the (variable) trigger condition-B generator 62 to the recorder 42.

A configuration of the (variable) trigger condition-B generator 62 is described here more specifically. The (variable) trigger condition-B generator 62 includes a trigger-signal parameter storage 66 and a trigger calculator 68.

The trigger-signal parameter storage 66 stores therein a parameter for generating a trigger condition, which is acquired by the device-side parameter setter 44. The trigger-signal parameter storage 66 is realized by, for example, a semiconductor memory device such as a RAM (Random Access Memory) or a flash memory, a hard disk, an optical disk, or the like.

For example, the trigger calculator 68 generates a state recording trigger signal as bit information having H/L states. In this case, the trigger calculator 68 shifts the state recording trigger signal from L to H at a timing at which the trigger condition is established. The generation condition of the trigger signal can be described, for example, as described below.

$$(\text{Variable } BBBB > \text{Variable } DDDD) \qquad \text{Expression (1)}$$

That is, when a variable BBBB is larger than a variable DDDD (FIG. 4), the trigger calculator 68 sets the state recording trigger signal to H, and performs a process to output a recording variable 2 (FIG. 4) corresponding to the variable DDDD to the state record storage 52. On the other hand, when the variable BBBB is equal to or smaller than the variable DDDD, the trigger calculator 68 sets the state recording trigger signal to L, and ends the process to output the recording variable 2 (FIG. 4) to the state record storage 52.

A detailed processing example of the (variable) trigger condition-B generator 62 is described based on FIG. 4. FIG. 4 is a diagram illustrating an example of parameters for a trigger condition to be stored in the state-recording variable-address storage 50. Pieces of information similar to those at addresses from 0E000h to 0FFFFh in FIG. 4 are also memorized in the trigger-signal parameter storage 66, and used for the calculation by the trigger calculator 68. Since the state quantity address and the storage address are identical to those in FIG. 3, explanations thereof are omitted.

As illustrated in FIG. 4, the trigger condition addresses from 0E000h to 0EFFFh are used for generation of the trigger condition in the trigger calculator 68. That is, variables set to 0E000h to 0EFFFh correspond to the parameters related to the generation of the trigger condition.

More specifically, the trigger calculator 68 according to the present embodiment uses Reverse Polish Notation. The Reverse Polish Notation is a notation in which operators follow their operands. For example, when it is described as 34+ by the Reverse Polish Notation, it means 3+4. When an arithmetic expression described by the Reverse Polish Notation is to be calculated, signs are first read by the trigger calculator 68 in order from the top of the described arithmetic expression. Subsequently, if the sign is other than the operators, the trigger calculator 68 accumulates values in a stack. If the sign is the operator, the trigger calculator 68 extracts a value from the stack to perform calculation, and repeats an operation to accumulate the calculation results in the stack. In this manner, since the calculation process in the trigger calculator 68 is simplified, the calculation process can be performed at a high speed.

In the example of FIG. 4, the trigger parameters for the generation condition of the trigger signal are a variable at an address "0001h", a variable at an address "0003h", and an operator "0F000h". That is, the generation condition of the trigger signal is defined as (variable 0001h), (variable 0003h), and (operator 0F000h) according to the Reverse Polish Notation. Here, since the operator 0F000h is associated with ">" beforehand, the generation condition of the trigger signal becomes as follows.

$$(\text{Variable } 0001h) > (\text{Variable } 0003h) \qquad \text{Expression (2)}$$

This is equivalent to process the expression (1). That is, if the ground-side parameter setter 12 sets variables in areas of the trigger condition addresses from 0E000h to 0EFFFh as the trigger parameters for the generation conditions via the device-side parameter setter 44, the trigger calculator 68 can be caused to generate an arbitrary trigger condition.

Further, an initial value of the parameter for generating the trigger condition is set beforehand in the trigger condition generator 48 and the state-recording variable-address storage 50. Each of the ground-side parameter setter 12 (FIG. 1), the on-board parameter setter 30 (FIG. 1), and the device-side parameter setter 44 can perform a process to initialize the parameter setting in the trigger condition generator 48 and the state-recording variable-address storage 50. For example, the ground-side parameter setter 12 in the ground system 10 (FIG. 1) initializes the parameters set by the device-side parameter setter 44 to an initial value. Accordingly, even if the operation becomes unstable at the time of changing the parameter, the parameter can be returned to the initial value, for which the operation is guaranteed, and thus the reliability of the system can be ensured. The device-side parameter setter 44 according to the present embodiment corresponds to a parameter initializer.

Changes of the trigger condition and the recording state are performed to change data to be used for data analysis. However, when the trigger condition can be changed arbitrarily, correspondence between the trigger condition and the recorded state quantity of the device may not be ensured. Therefore, in the present embodiment, an identification number for identifying a trigger condition and a variable can be added to one of the parameters to be set.

Figure 5:
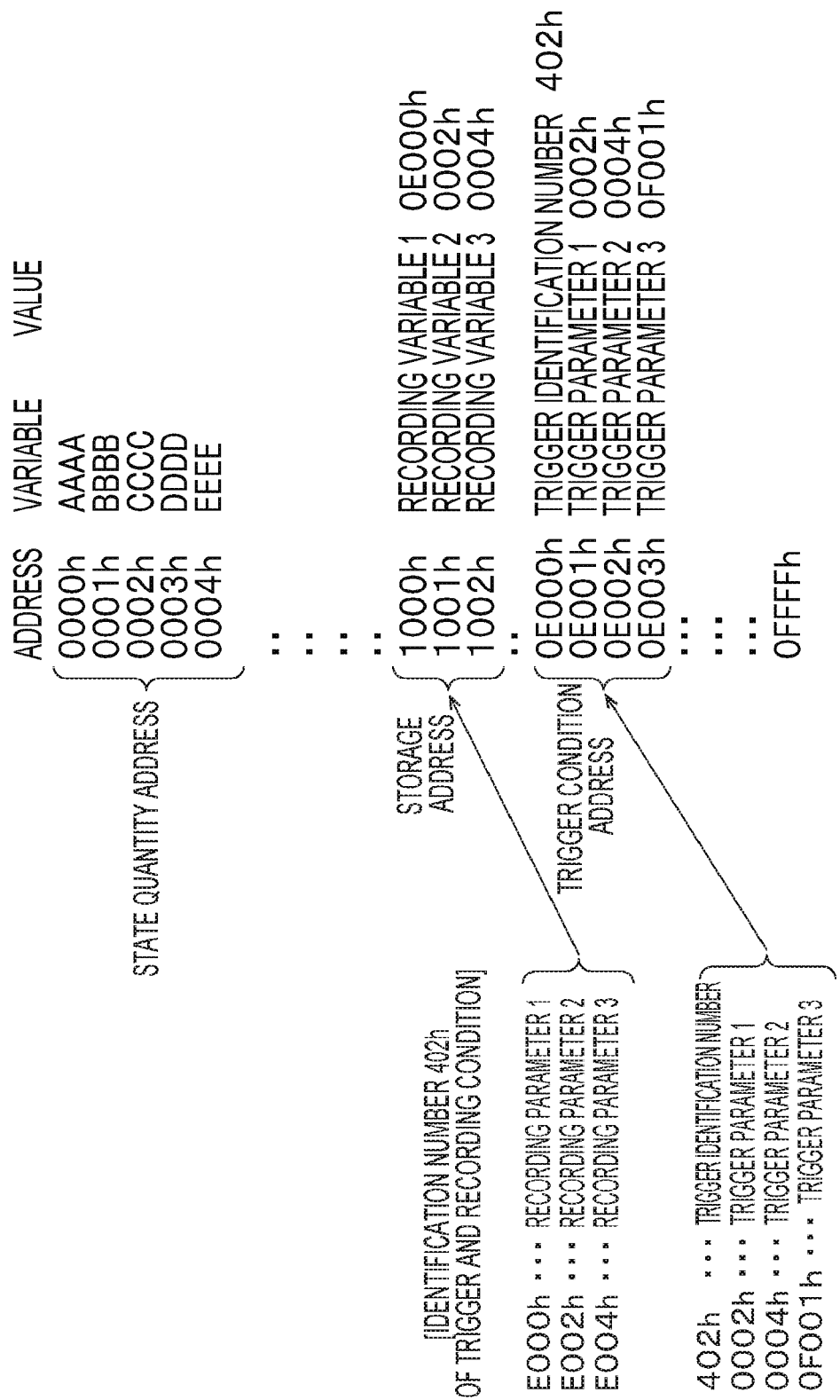
FIG. 5 is a diagram illustrating an example of adding an identification number for identifying a trigger condition and a variable.

FIG. 5 is a diagram illustrating an example of adding an identification number for identifying a trigger condition and a variable. As described above, addresses from 0000h to 0DFFFh indicate the state quantity addresses, addresses from 1000h to 1FFFh indicate the storage addresses, addresses from 0E000h to 0EFFFh indicate parameters to be used for generating the trigger condition, and addresses after an address 0F000h indicate identification of the operator. Recording variables 1 to N in the storage address are variables to be recorded in the state record storage 52 as state quantities by the device-side state recording executor 54.

As illustrated in FIG. 5, for example, an address "0E000h" corresponding to the recording variable 1 corresponds to an address at which an identification number "402h" that identifies the trigger condition is stored. Accordingly, the ground system (FIG. 1) can acquire the address "0E000h" in the state-recording variable-address storage 50 by referring to the "recording variable 1" in the state quantities acquired from the state record storage 52. That is, the state quantity stored at the address "0E000h" is the identification number "402h". More specifically, the device-side parameter setter 44 sets a plurality of parameter groups whose trigger conditions are different from each other at a plurality of address groups from 0E000h to 0FFFFh in the memory space accessible by the device-side parameter setter 44, and sets the identification number "402h" and the like that identify each of the parameter groups as one of the parameters.

Further, the variables indicated by the addresses after the address at which the identification number "402h" is stored are the trigger parameters to be used for generating the trigger methods. That is, an address "0002h" stored at an address "0E001h" corresponds to a trigger parameter 1, an address "0004h" corresponds to a trigger parameter 2, and an address "0F001h" corresponds to a trigger parameter 3. Recording parameters are stored sequentially from an address "1000h" where the address "0E000h" is stored. "0E000h" is a recording parameter 1, "0002h" is a recording parameter 2, and "0004h" is a recording parameter 3. In this manner, based on the address "0E001h" where the identification number "402h" is stored, the storage conditions of the trigger parameters and the recording parameters are regularized. In this manner, the state quantity corresponding to the identification number "402h" or the like that identifies each of the parameter groups is memorized in a part of addresses from 0000h to 0FFFh in the memory space.

Accordingly, the ground system 10 can acquire the trigger parameter for the trigger condition and the recording parameter corresponding to the identification number "402h" by referring to the address "0E000h" in the state-recording variable-address storage 50, at which the state quantity is stored as the "recording variable 1". In this manner, the ground system 10 (FIG. 1) can associate the acquired state quantity and the parameter for the trigger condition with each other by acquiring the trigger parameter for the trigger condition and the recording parameter corresponding to the identification number "402h" and managing the parameter for the trigger condition associated with the identification number "402h".

Figure 6:
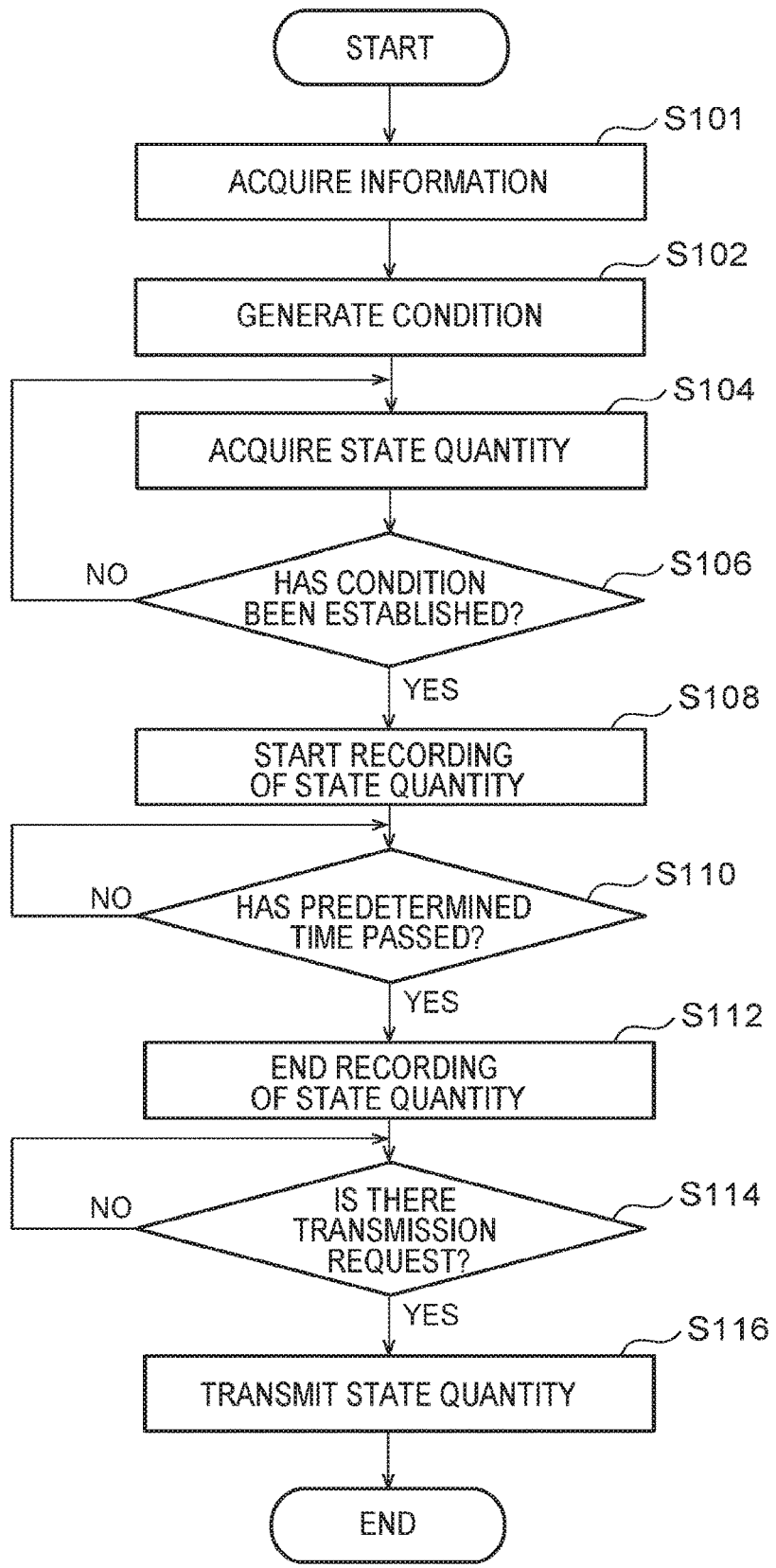
FIG. 6 is a flowchart illustrating an example of an acquisition process of a state quantity in the device.

FIG. 6 is a flowchart illustrating an example of an acquisition process of the state quantity in the device 26. As illustrated in FIG. 6, the ground-side parameter setter 12 first sets a parameter for the trigger condition to start recording by the recorder 42. The device-side parameter setter 44 acquires the parameter via the external communication network NW1 (Step S100). Next, the trigger condition generator 48 and the state-recording variable-address storage 50 store the parameter therein. Subsequently, the trigger calculator 68 of the trigger condition generator 48 generates a trigger condition by using the parameter (Step S102).

The trigger calculator 68 acquires the state quantity of the device 26 to be used for determination of the trigger condition (Step S104), and determines whether the trigger condition is established with respect to the state quantity acquired from the device 26 (Step S106). When the trigger condition is established (YES at Step S106), the trigger calculator 68 causes the device-side state recording executor 54 of the recorder 42 to record the state quantity of the device 26 (Step S108). The device-side state recording executor 54 performs a process to record the state quantity of the device 26 in the state record storage 52. On the other hand, when the trigger condition is not established, (NO at Step S106), the trigger calculator 68 repeats the processes from Step S104.

Next, the trigger calculator 68 determines whether a predetermined time has passed since establishment of the trigger condition (Step S106). When the predetermined time has not passed (NO at Step S110), the trigger calculator 68 causes the recorder 42 to continue recording of the state quantity of the device 26. On the other hand, when the predetermined time has passed (YES at Step S110), the trigger calculator 68 causes the recorder 42 to end recording of the state quantity of the device 26 (Step S112).

Next, the device-side state record transmitter 46 determines whether there is a request of data transmission from the ground system 10 (Step S114). When there is no request (NO at Step S114), the device-side state record transmitter 46 continues determination of whether there is a request of data transmission from the ground system 10.

On the other hand, when there is a request (YES at Step S114), the device-side state record transmitter 46 causes the state record storage 52 to transmit the state quantity (Step S112) to end the entire process.

In this manner, the trigger calculator 68 generates a trigger condition by using a parameter to be used for setting the trigger condition, which is acquired via the external communication network NW1. Next, the trigger calculator 68 causes the recorder 42 to start recording of the state quantity of the device 26, when the trigger condition is established with respect to the state quantity acquired from the device 26. After passage of the predetermined time, the trigger calculator 68 ends recording of the state quantity of the device 26.

As described above, according to the present embodiment, the trigger condition generator 48 causes the recorder 42 to record a state quantity of the device 26, upon establishment of a trigger condition set by using a parameter acquired by the device-side parameter setter 44. Accordingly, the trigger condition can be changed without modifying the software.

While certain embodiments have been described, these embodiments have been presented by way of example only, and are not intended to limit the scope of the inventions. Indeed, the novel embodiments described herein may be embodied in a variety of other forms and various omissions, substitutions, and changes may be made without departing from the spirit of the inventions. The embodiments and their modifications are intended to be included in the scope and the spirit of the invention and also in the scope of the invention and their equivalents described in the claims.

The invention claimed is:

1. A device state recording system comprising:
a ground system and an on-board system, the system recording a state quantity of a device in the on-board system in response to an instruction from the ground system, wherein
the on-board system includes a state recording device provided in the device, and
the state recording device includes:
a device-side parameter setter configured to set at least a parameter related to generation of a trigger condition for instructing start of recording of a state quantity of the device, and a parameter related to the state quantity of the device, and
a state record storage configured to record therein the state quantity of the device based on the parameter related to generation of the trigger condition and the parameter related to the state quantity of the device; wherein
the ground system includes:
a ground-side parameter setter configured to set at least a parameter related to generation of the trigger condition for instructing start of recording of the state quantity of the device, and a parameter related to the state quantity of the device, and
a first communication controller configured to control communication with the on-board system, including transmission of the parameter to the on-board system;
the on-board system includes:
a second communication controller configured to control communication with the ground system, including reception of the parameter, and
an on-board parameter setter configured to set the parameter received under control of the second communication controller to the state recording device;
the state recording device further includes:
a trigger condition generator configured to generate the trigger condition based on the parameter set by the device-side parameter setter, and
a state recording executor configured to control recording of the state quantity of the device in the state record storage, based on the trigger condition generated by the trigger condition generator; and
the device-side parameter setter sets the parameter related to the device, of the parameters set by the on-board parameter setter.

2. The system of claim 1, wherein the state recording executor executes control to record the state quantity of the device in the state record storage, without affecting an operation of the on-board system.

3. The system of claim 1, wherein the on-board system includes a parameter initializer configured to initialize the parameter set by the device-side parameter setter to an initial value.

4. A device state recording system, comprising:
a ground system and an on-board system, the system recording a state quantity of a device in the on-board system in response to an instruction from the ground system, wherein
the on-board system includes a state recording device provided in the device, and
the state recording device includes:
a device-side parameter setter configured to set at least a parameter related to generation of a trigger condition for instructing start of recording of a state quantity of the device, and a parameter related to the state quantity of the device, and a state record storage configured to record therein the state quantity of the device based on the parameter related to generation of the trigger condition and the parameter related to the state quantity of the device;

wherein the device-side parameter setter sets the parameters at a plurality of addresses in a memory space accessible by the device-side parameter setter, and the state quantity of the device is memorized in a part of the addresses;

wherein the device-side parameter setter sets a plurality of parameter groups having the trigger condition different from each other at a plurality of address groups in the memory space accessible by the device-side parameter setter, and sets an identification number that identifies each of the parameter groups as one of the parameters.

5. The system of claim 4, wherein a state quantity corresponding to the identification number that identifies each of the parameter groups is memorized in a part of the addresses in the memory space.

6. The system of claim 1, comprising an analyzer configured to analyze the state quantity of the device recorded in the state record storage, based on the parameter related to generation of the trigger condition and the parameter related to a state type of the device.

7. The system of claim 6, wherein a sampling cycle of the state quantity of the device is shorter than a data recording cycle of the analyzer.

8. A device state recording device comprising:
a communication controller configured to control communication with a ground system and an on-board system, including reception of a parameter;
a device-side parameter setter configured to set at least a parameter related to generation of a trigger condition for instructing start of recording of a state quantity of a device, and a parameter related to the state quantity of the device, based on information received under control of the communication controller; and
a state record storage configured to record therein the state quantity of the device based on the parameter related to generation of the trigger condition and the parameter related to the state quantity of the device; wherein
the ground system includes:
a ground-side parameter setter configured to set at least a parameter related to generation of the trigger condition for instructing start of recording of the state quantity of the device, and a parameter related to the state quantity of the device, and
a first communication controller configured to control communication with the on-board system, including transmission of the parameter to the on-board system;

the on-board system includes:
a second communication controller configured to control communication with the ground system, including reception of the parameter, and
an on-board parameter setter configured to set the parameter received under control of the second communication controller to the state recording device;
the state recording device further includes:
a trigger condition generator configured to generate the trigger condition based on the parameter set by the device-side parameter setter, and
a state recording executor configured to control recording of the state quantity of the device in the state record storage, based on the trigger condition generated by the trigger condition generator; and
the device-side parameter setter sets the parameter related to the device, of the parameters set by the on-board parameter setter.

9. The device state recording device of claim 8, wherein the state recording executor executes control to record the state quantity of the device in the state record storage, without affecting an operation of the on-board system.

10. The device state recording device of claim 8, wherein the on-board system includes a parameter initializer configured to initialize the parameter set by the device-side parameter setter to an initial value.

11. The device state recording device of claim 8, wherein the device-side parameter setter sets the parameters at a plurality of addresses in a memory space accessible by the device-side parameter setter, and the state quantity of the device is memorized in a part of the addresses.

12. The device state recording device of claim 11, wherein the device-side parameter setter sets a plurality of parameter groups having the trigger condition different from each other at a plurality of address groups in the memory space accessible by the device-side parameter setter, and sets an identification number that identifies each of the parameter groups as one of the parameters.

13. The device state recording device of claim 12, wherein a state quantity corresponding to the identification number that identifies each of the parameter groups is memorized in a part of the addresses in the memory space.

14. The device state recording device of claim 8, comprising an analyzer configured to analyze the state quantity of the device recorded in the state record storage, based on the parameter related to generation of the trigger condition and the parameter related to a state type of the device.

15. The device state recording device of claim 14, wherein a sampling cycle of the state quantity of the device is shorter than a data recording cycle of the analyzer.

* * * * *